(12) United States Patent  
Grimanis et al.

(10) Patent No.: US 9,657,841 B2  
(45) Date of Patent: May 23, 2017

(54) LOADING MECHANISM FOR FLUID SEALS

(71) Applicant: A.W. CHESTERTON COMPANY, Woburn, MA (US)

(72) Inventors: Michael P. Grimanis, Wayland, MA (US); Adam Powell, West Newbury, MA (US)

(73) Assignee: A.W. CHESTERTON COMPANY, Woburn, MA (US)

( * ) Notice: Subject to any disclaimer, the term of this patent is extended or adjusted under 35 U.S.C. 154(b) by 135 days.

(21) Appl. No.: 14/225,936

(22) Filed: Mar. 26, 2014

(65) Prior Publication Data

US 2014/0291937 A1 Oct. 2, 2014

Related U.S. Application Data

(60) Provisional application No. 61/805,339, filed on Mar. 26, 2013.

(51) Int. Cl.
*F16J 15/18* (2006.01)
*F16K 41/02* (2006.01)

(52) U.S. Cl.
CPC ............. *F16J 15/18* (2013.01); *F16J 15/184* (2013.01); *F16K 41/02* (2013.01)

(58) Field of Classification Search
CPC . F16J 15/18; F16J 15/184; F16J 15/24; F16K 41/02
USPC .................................................. 277/520, 522
See application file for complete search history.

(56) References Cited

U.S. PATENT DOCUMENTS

| | | | |
|---|---|---|---|
| 750,090 A * | 1/1904 | Coleman | F16J 15/184 384/149 |
| RE17,976 E | 2/1931 | Brammer | |
| 1,958,221 A * | 5/1934 | Wilcox | F16J 15/20 277/516 |
| 3,608,912 A | 9/1971 | Templin et al. | |
| 4,411,438 A * | 10/1983 | Scobie | F16K 41/026 277/520 |
| 4,560,176 A * | 12/1985 | Hoff | E21B 33/08 277/505 |
| 4,795,171 A * | 1/1989 | Quevedo Del Rio | F04D 29/106 277/512 |
| 5,908,046 A * | 6/1999 | Mosman | F16K 41/02 137/312 |

(Continued)

FOREIGN PATENT DOCUMENTS

| | | |
|---|---|---|
| FR | 2590347 A1 | 5/1987 |
| FR | 2593578 A2 | 7/1987 |
| GB | 23808 | 0/1915 |

(Continued)

*Primary Examiner* — Nicholas L Foster
(74) *Attorney, Agent, or Firm* — Nelson Mullins Riley & Scarborough LLP; Anthony A. Laurentano

(57) ABSTRACT

A loading mechanism for a fluid seal that allows an installer to change or adjust the axial bias applied to a stacked set of sealing elements. The loading mechanism includes a bolt-like adjusting element that has a foot portion attached to one end and a rail element that is threadingly coupled at an opposite end. By rotating the adjusting element, the rail element can travel axially along the adjusting element. The axial displacement of the rail element allows the installer to select the amount of axial force or bias applied by the loading mechanism to the sealing elements.

7 Claims, 7 Drawing Sheets

(56) References Cited

U.S. PATENT DOCUMENTS 6,220,604 B1     4/2001   Champlin
6,276,259 B1 *   8/2001   Pecca ................... F16J 15/184
                                                          92/168

FOREIGN PATENT DOCUMENTS

GB          501304     2/1939
GB            4279     9/2011

* cited by examiner

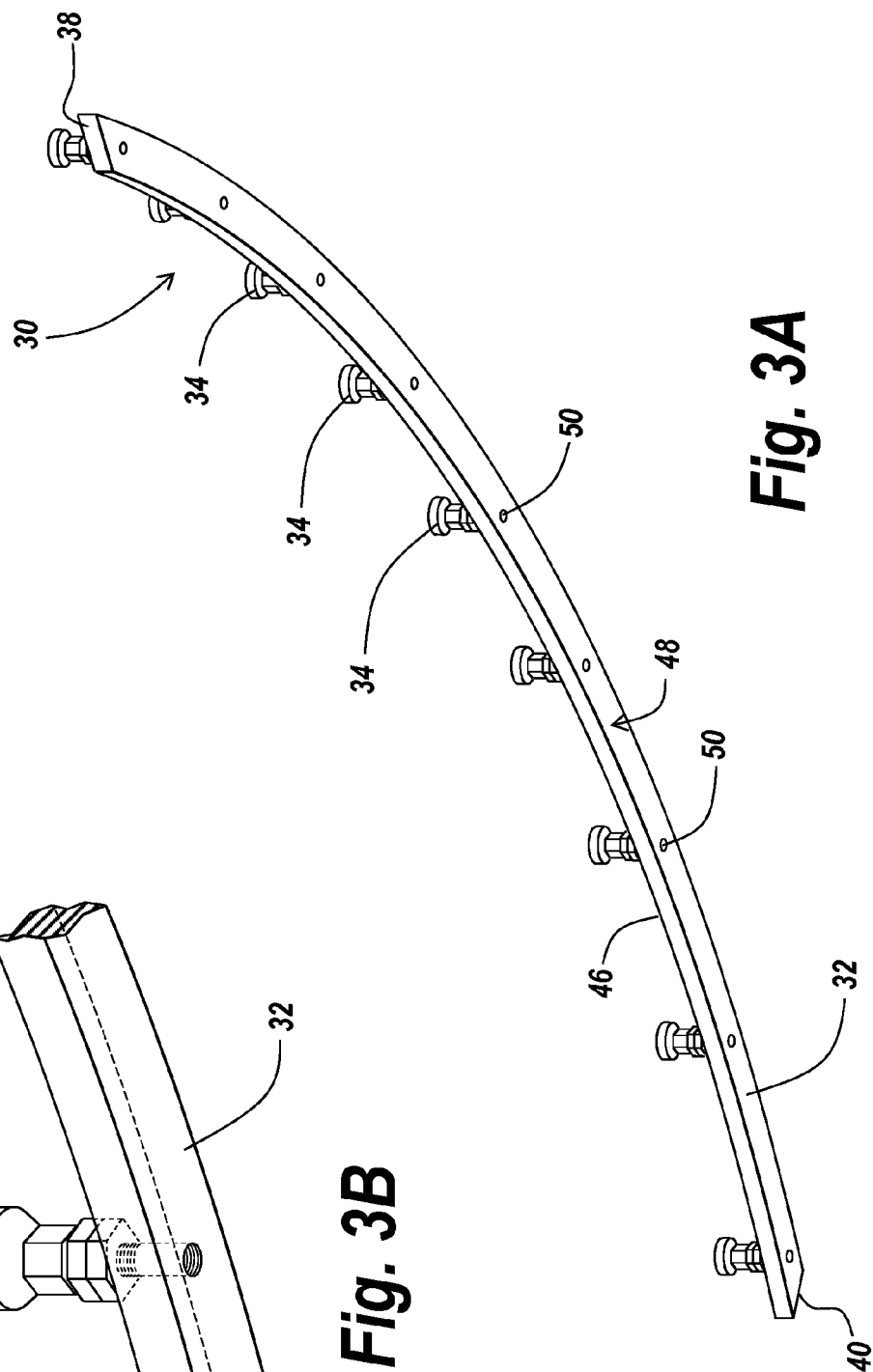

LOADING MECHANISM FOR FLUID SEALS

RELATED APPLICATIONS

This application claims priority to U.S. Provisional Application No. 61/805,339, entitled LOADING MECHANISM FOR FLUID SEALS, filed on Mar. 26, 2013, the contents of which are incorporated herein by reference.

FIELD OF THE INVENTION

The present invention relates to mechanical fluid sealing systems, and more particularly relates to systems that employ multiple sealing elements concentrically disposed about a rotating or reciprocating shaft for sealing fluids in a system.

BACKGROUND OF THE INVENTION

In a conventional mechanical fluid sealing system, seals are provided to prevent fluid from leaking around a rotating or reciprocating shaft. FIG. 1 illustrates a conventional sealing arrangement used with a conventional fluid seal. The seal arrangement shown is commonly known as a stacked set seal. However, other seal configurations are also known and can be used. As illustrated, a gland element 1 is mounted to an equipment housing 3, also referred to as stationary equipment or a stuffing box, by known mechanical fasteners, such as by one or more bolts. A shaft or rod 4 of the mechanical system passes through the housing 3 and protrudes therefrom. A set of seals 2 are disposed within an annular cavity or region of the housing 3 and are concentrically disposed about the shaft to prevent or minimize the leakage of process fluid from the housing and which may leak from around the rotating shaft. The gland element has an axially extending portion and when the gland is mounted to the housing 3, the gland portion compresses the seals 2 into fluid and sealing engaging contact with the housing and the shaft. The seals 2 are typically constructed of an elastomeric material. Depending on the design and specific material of the seals, they require a compression equivalent to between about 2% and about 5% of the height of the seals.

When mounting the seals 2 in the housing 3 in the conventional manner, it is necessary to remove the gland 1 from the housing 3, place the seals in the annular cavity formed between the equipment 3 and the gland 1, and then remount the gland to the housing 3. The gland 1 then compresses the seals 2 into place and into sealing contact with the respective surfaces of the housing, shaft and gland.

This conventional mounting arrangement has a number of disadvantages. One drawback of this conventional sealing arrangement is that it requires that the gland be disassembled and then reassembled around the shaft 4 in order to insert or replace the seals 2. Additionally, the shaft 4 typically must be in place in order to secure the seals within the annular cavity while the gland 1 is installed. Another drawback is that the depth of the annular cavity must be predetermined and carefully calculated based on a number of system parameters, including the size of the gland 1 and related equipment and the number and size of the seals 2 in order to ensure that sufficient compressive pressure is maintained on the seals 2.

SUMMARY OF THE INVENTION

It is thus an object of the present invention to provide a fluid sealing arrangement and system that allows the compressive force on the sealing elements to be adjusted in real time, for example, during installation.

The present invention is directed towards a loading mechanism for a fluid seal that allows an installer to change or adjust the axial bias applied to a stacked set of sealing elements. The loading mechanism includes a bolt-like adjusting element that has a foot portion attached to one end and a rail element or portion that is threadingly attached or coupled at an opposite end. By rotating the adjusting element, the rail element can travel axially along the adjusting element. The axial displacement of the rail element allows the installer to select the amount of axial force or bias applied by the loading mechanism to the sealing elements.

According to one embodiment, the present invention is directed to a loading mechanism for use with a fluid seal. The loading mechanism includes an adjusting element having a threaded first end and an opposed second end, a rail element having one or more threaded apertures that is coupled to the threaded first end of the adjusting element, optionally one or more nut elements coupled to the first end of the adjusting element, and a foot portion coupled to the second end of the adjusting element and coupled thereto via a retaining element. The adjusting element can further comprise an intermediate portion disposed between the first and second ends, where the intermediate portion has a thickness that is larger than the thickness of the first and second ends. The foot portion can include a central bore having a first bore portion having a first diameter and a second bore portion having a second diameter larger than the first diameter, and if preferred, an outer surface having a first sloped portion having a top surface and second substantially cylindrical surface.

The adjusting element can include a recess that is formed on the second end, where the recess is sized and configured for seating the retaining element. Moreover, the adjusting element is rotatable relative to the foot portion.

The rail element is arcuate in shape and comprises a plurality of apertures formed therein, where each of the apertures is sized and configured for cooperating with a respective adjusting element.

The present invention is also directed to a sealing and loading assembly for a mechanical fluid seal for sealing a shaft, where the mechanical fluid seal includes a housing having a channel and a plurality of sealing elements disposed within the channel. The loading assembly is disposed within the channel between the plurality of sealing elements and a wall of the channel for providing an adjustable loading force to the plurality of sealing elements. The loading assembly includes an adjusting element having a threaded first end and an opposed second end, a rail element having one or more threaded apertures that is coupled to the threaded first end of the adjusting element, one or more nut elements coupled to the first end of the adjusting element, and a foot portion coupled to the second end of the adjusting element and coupled thereto via a retaining element.

The adjusting element further comprises an intermediate portion disposed between the first and second ends, where the intermediate portion has a thickness that is larger than the thickness of the first and second ends. The foot portion can include a central bore having a first bore portion having a first diameter and second bore portion having a second diameter larger than the first diameter. The foot portion can further include an outer surface having a first sloped portion having a top surface and a second substantially cylindrical surface.

The adjusting element has a recess formed on the second end, where the recess is sized and configured for seating the retaining element. The adjusting element is rotatable relative to the foot portion.

The rail element is arcuate in shape and comprises a plurality of apertures formed therein, wherein each of the apertures is sized and configured for cooperating with a respective adjusting element. The rail element is also axially movable within the channel upon rotation of the adjusting element so as to apply an axial load to the plurality of sealing elements.

The present invention is also directed to a method of applying an axial load to a sealing assembly of a mechanical fluid sealing system. The method includes mounting the sealing assembly and a loading assembly within a channel formed in the fluid sealing system, where the loading assembly includes an adjusting element and a rail element. The method also includes applying a rotational force to the adjusting element of the load assembly so as to move the rail element in an axial direction, and applying an axial loading force to the sealing assembly with the rail element when the adjusting element is rotated.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIGS. 3A and 3B are perspective views of a partial portion of the loading mechanism of the mechanical fluid sealing system according to the teachings of the present invention.

DETAILED DESCRIPTION

The present invention provides a mechanical fluid sealing system for providing sealing on a rotating shaft or other suitable device. The invention will be described below relative to illustrated embodiments. Those skilled in the art will appreciate that the present invention may be implemented in a number of different applications and embodiments and is not specifically limited in its application to the particular embodiment depicted herein.

The terms "mechanical fluid sealing system," "sealing system" and "sealing assembly" as used herein are intended to include various types of mechanical fluid sealing systems, including single or solid seals, split seals, concentric seals, spiral seals, and other known mechanical seal and sealing types and configurations.

The term "shaft" is intended to refer to any suitable device in a mechanical system to which a mechanical fluid sealing system can be mounted and includes shafts, rods and other known devices.

The terms "axial" and "axially" used herein refer to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

The term "axially inner" as used herein refers to that portion of the stationary equipment and a mechanical sealing system disposed proximate the mechanical system employing the seal assembly. Conversely, the term "axially outer" as used herein refers to the portion of stationary equipment and a seal assembly distal from the mechanical sealing system.

The term "radially inner" as used herein refers to the portion of the seal assembly proximate a shaft. Conversely, the term "radially outer" as used herein refers to the portion of the seal assembly distal from the shaft.

The terms "stationary equipment" and/or "static surface" and/or "stuffing box" as used herein are intended to include any suitable stationary structure housing a shaft or rod to which a mechanical fluid sealing system is secured. A gland assembly may or may not be provided based on the system design or configuration. Those of ordinary skill will recognize that if a gland assembly is used it can form part of the mechanical seal or part of the stationary equipment.

The mechanical fluid sealing system of an illustrative embodiment of the present invention may employ an improved loading mechanism for applying an axial or compressive force to one or more sealing elements. The axial force can be adjusted by rotating one ore more components (e.g., an adjusting element) of the loading mechanism, thus translating the rotational movement of the component into axial or linear movement of another component (e.g., a rail element).

Figure 1:
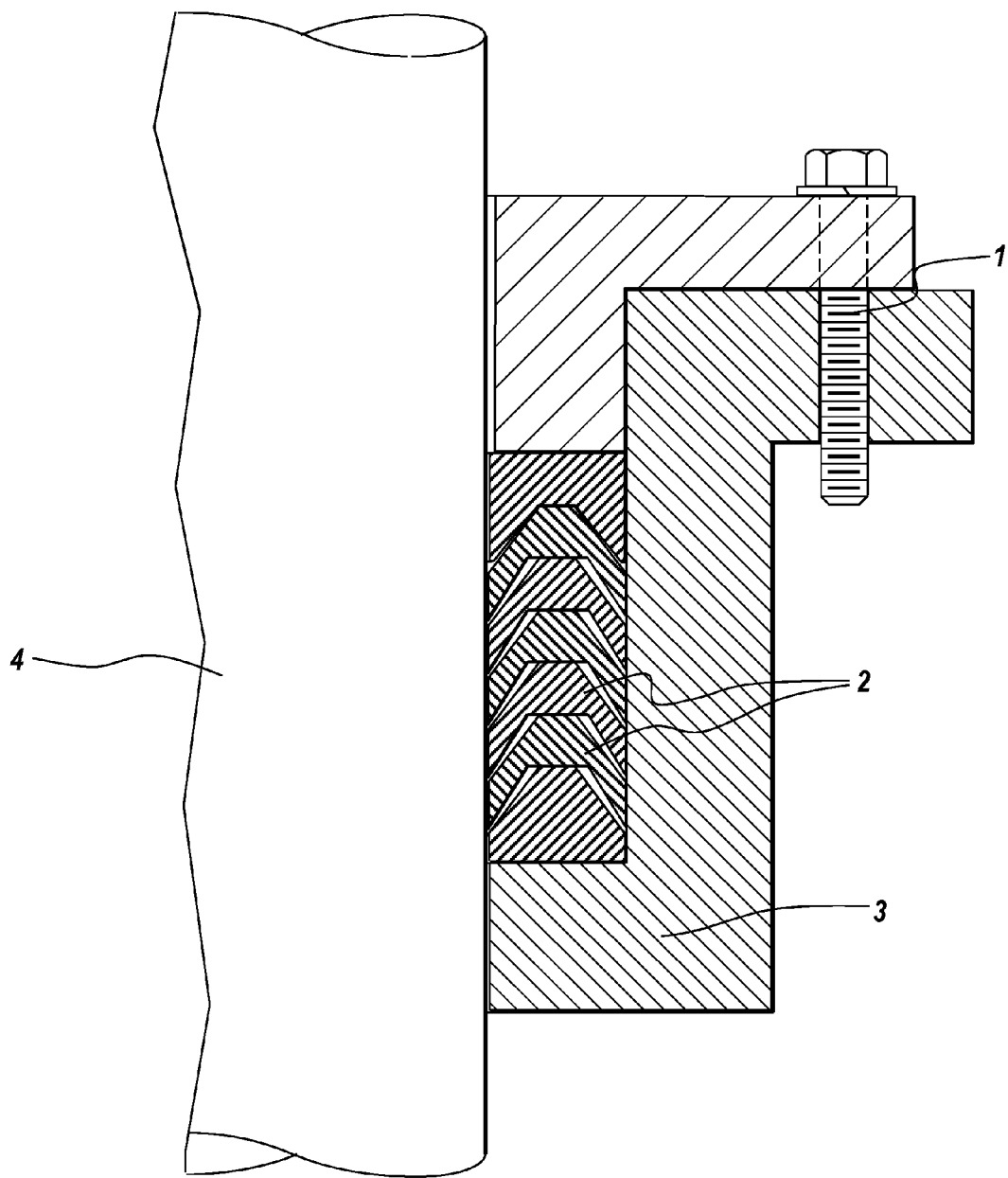
FIG. 1 is a partial cross-sectional view of a conventional mechanical fluid sealing system employing multiple annular seals that forma sealing assembly.
Figure 2A:
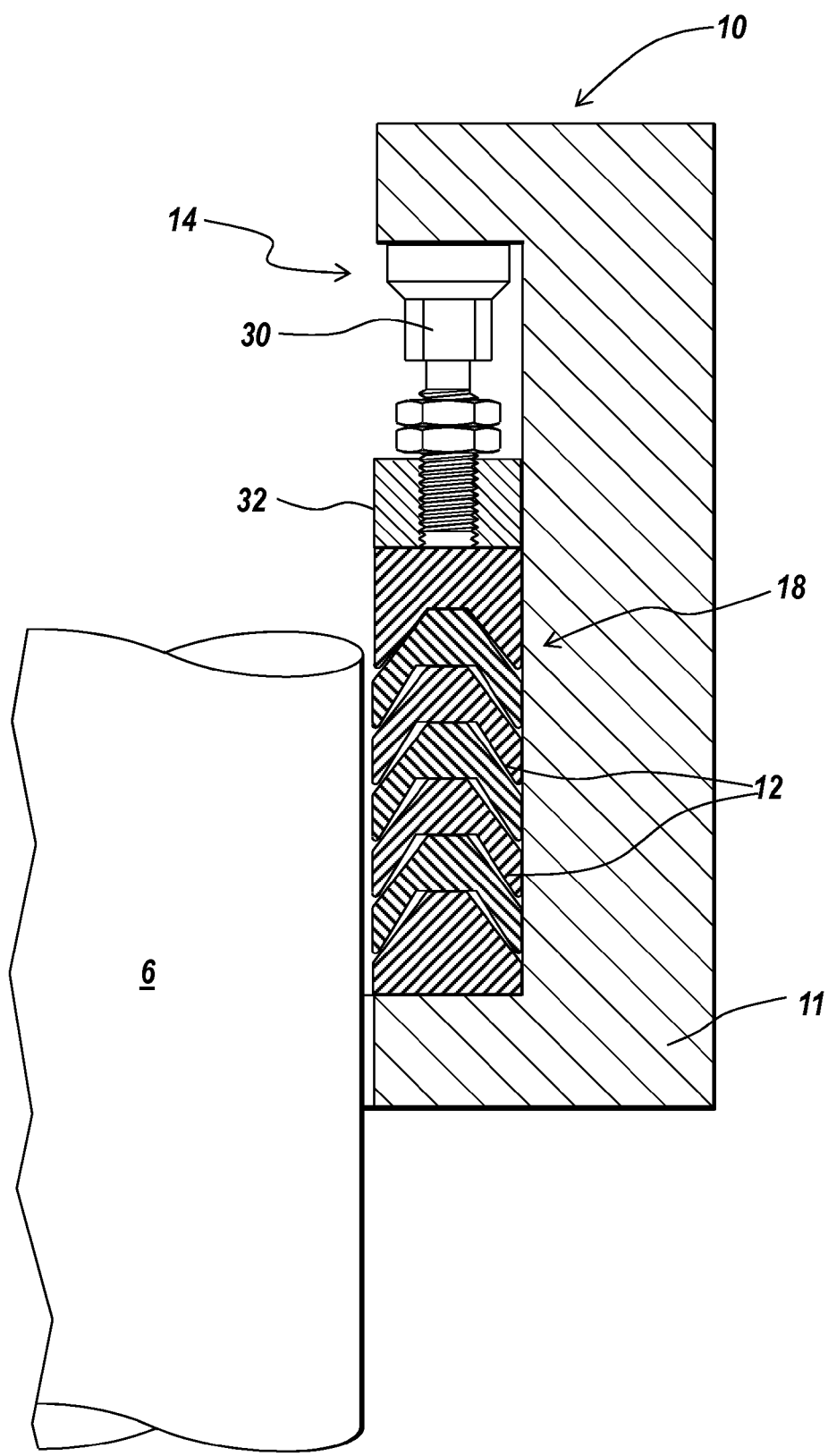
FIG. 2A is a partial cross-sectional view of a mechanical fluid sealing system employing an internally mounted loading mechanism for applying a load to the sealing assembly according to the teachings of the present invention, where the sealing assembly is in an unloaded state.
Figure 2B:
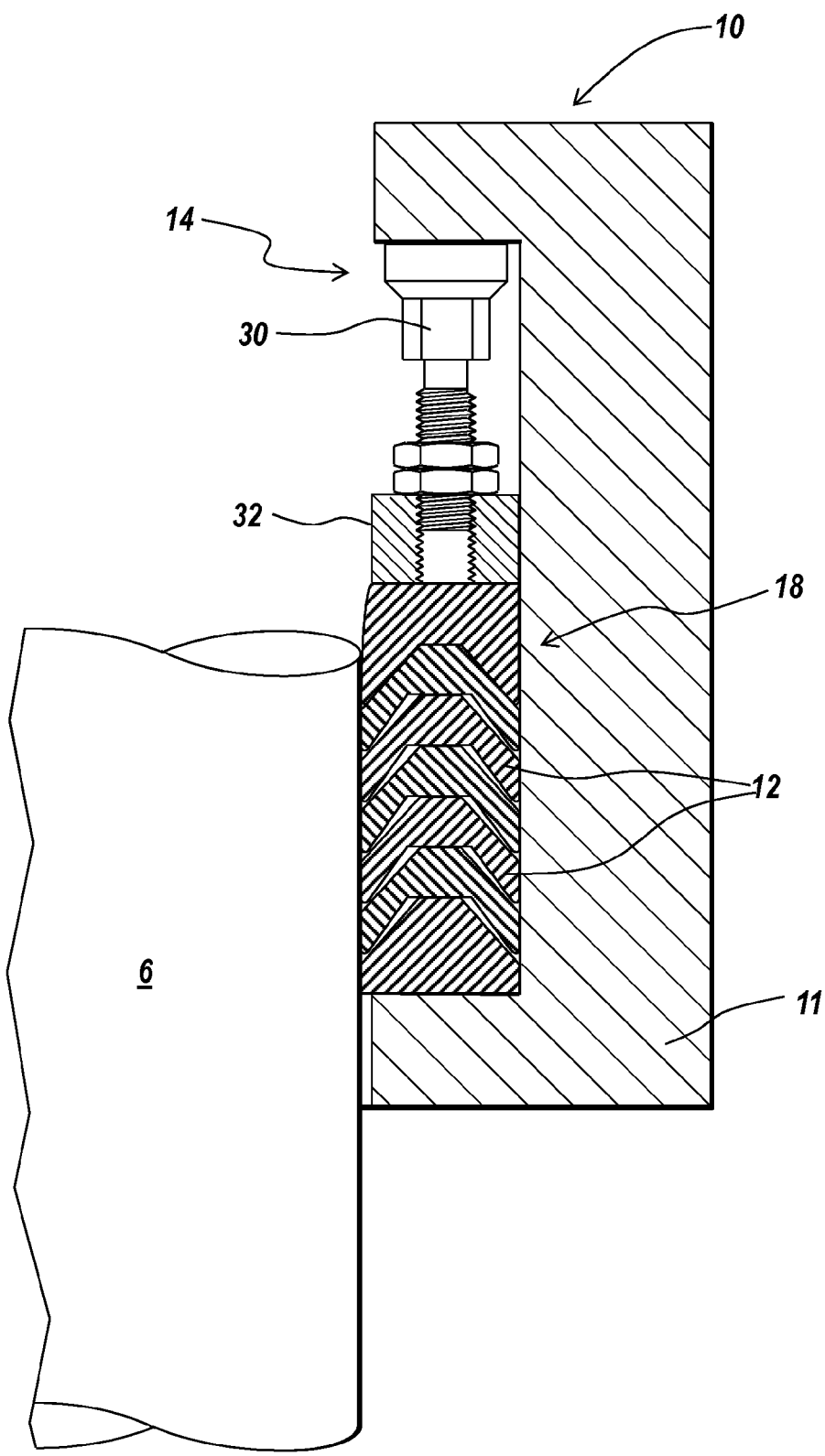
FIG. 2B is a partial cross-sectional view of a mechanical fluid sealing system employing an internally mounted loading mechanism for applying a load to the sealing assembly according to the teachings of the present invention, where an axial biasing force is applied to the sealing assembly by the loading mechanism to place the sealing assembly in a loaded state.
Figure 4:
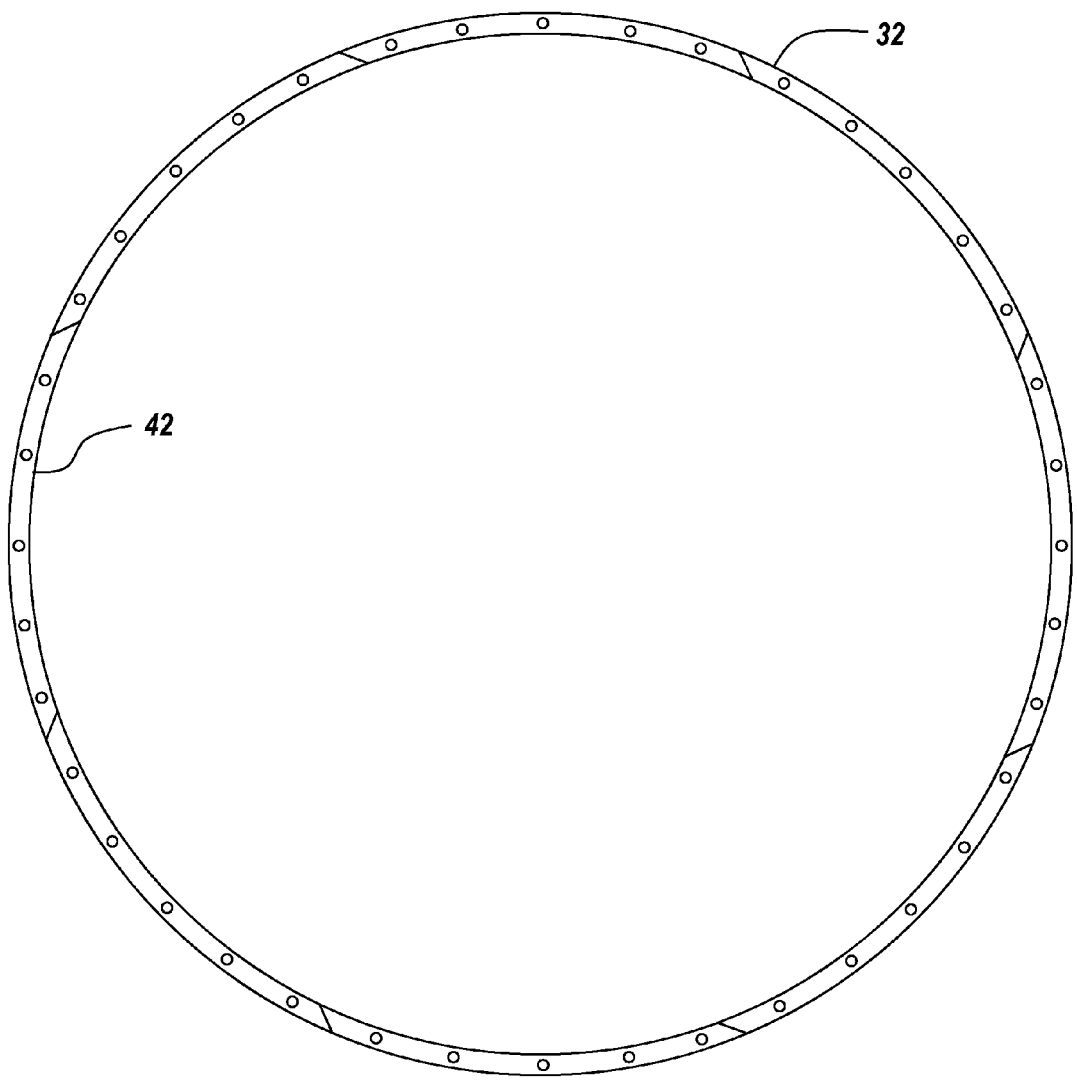
FIG. 4 is a partial perspective view of a segmented rail portion of the loading mechanism according to the teachings of the present invention.

FIGS. 2A and 2B illustrate the mechanical fluid sealing system 10 of the present invention. The illustrated system 10 includes an equipment housing 11 that contains a rotating shaft 6. The housing 11 can include an axially extending channel 14 formed along an inner surface of the housing 11. The channel 14 can be similar to the channel formed in the gland element of the conventional seal arrangement illustrated in FIG. 1. One of ordinary skill in the art will readily recognize that a gland, such as the gland 1 illustrated in FIG. 1, need not be employed in the mechanical fluid sealing system of the present invention.

The channel 14 can be sized and dimensioned to seat one or more sealing elements or seals 12. According to a preferred embodiment, the system employs a plurality of seals. The sealing elements 12 are stacked axially within the channel 14 to form a sealing assembly 18 and a loading mechanism or assembly 30 is disposed at an axially outer end of the channel 14 and contacts an outer surface of the sealing assembly 18. Those of ordinary skill in the art will readily recognize that any suitable number of sealing elements can be used depending upon the seal size, channel size, and the like. The loading mechanism 30 is positioned within the channel 14 so as to provide a changeable, variable or adjustable axial (e.g., compressive) loading force to the sealing assembly. For example, the loading mechanism 30 can be tightened with a suitable external tool or instrument, such as a torque wrench, which causes the loading mechanism 30 to exert a loading force against the sealing assembly 18 in the axial direction. When loaded, the sealing elements 12 sealingly engage the shaft and one or more walls of the channel in order to prevent or minimize the leakage of process fluid from the equipment housing 11. The illustrated sealing elements 12 can be solid or split seals and can be formed of any suitable elastomeric material.

As illustrated in FIGS. 3A-6, the loading mechanism or assembly 30 includes an arcuate shaped rail element or portion 32 that has coupled thereto a plurality of axially moveable loading elements 34. The rail portion 32 can be a single unitary piece (i.e., solid) or can be composed of a plurality of segmented rail portions (i.e., rail segments). If segmented, each rail segment can have end portions that include an interlocking feature that enable the rail segments to interlock with a corresponding rail segment. For example, the rail portion 32 if segmented can have opposed end portions 38 and 40. Either or both of these end portions can have an interlock feature formed thereon. Likewise, an adjacent rail segment 42 can have end portions or regions that also have an interlocking feature formed thereon. According to one practice, this interlocking feature can be complementary in shape to the interlocking feature formed on the end portions of the other rail segment. When placed together, the seal ring segments interlock and are hence self-aligning.

According to one embodiment, the end portions or regions of the rail portions or segments can be non-flat. The non-flat nature of the axial seal ring faces of the seal ring segments enables the segments to interact with each other in such a manner as to facilitate engagement of the segments with each other while concomitantly reducing or preventing sliding of the segments relative to each other. As used herein, the term "non-flat" is intended to cover a rail segment end portion that has more than a nominal amount or degree of surface feature(s) that are independent of any features that may be formed on the split surfaces as a result of the grain structure of the material of the seal rings. The axial end faces of the end portions are deemed to be non-flat if a surface feature other than natural material grain vagaries exists on the axial end face 25 when the face is viewed in either or both the axial direction, from the axially outermost to the axially innermost surface of the axial end face, and the radial direction, from the radially outermost to the radially innermost axial end face. For example, the axial end faces can have a non-flat surface feature that has an inclined shape, a declined shape, a V-shape, a zig-zag style shape (when viewed in cross-section), a tongue and groove configuration, a curved or non-linear shape, or any other suitable non-flat shape. The opposed axial end face on the opposed seal ring segment when disposed in confronting relationship relative to each other preferably has a shape that is complementary to this shape. When placed together, the seal ring segments interlock and are hence self-aligning. The non-flat nature of the end portions of the rail segments enables the segments to interact with each other in such a manner as to facilitate engagement of the segments with each other while concomitantly reducing or preventing sliding of the segments relative to each other.

Further, the end portions of the rail segments can be configured or designed so as to allow the segments to easily join or couple together. For example, the end portions of the rail segments can be angled so as to engage with an end portion or region of an adjacent rail segment. To this end, an interlocking feature, such as a tongue and groove arrangement, can also be used to ensure that the ends are sufficiently coupled together.

The illustrated rail portion 32 can include a top surface 46 and an opposed bottom surface 48. The rail portions can also include a series of threaded apertures 50 that are formed in the rail portion 32 and which extend between the top and bottom surfaces. One of ordinary skill in the art will readily recognize that any suitable number of apertures can be provided for mounting a loading element 34 therein. The apertures are preferably spaced apart along the rail at selected distances for each other. The spaces between the apertures can vary or can be the same.

Figure 5:
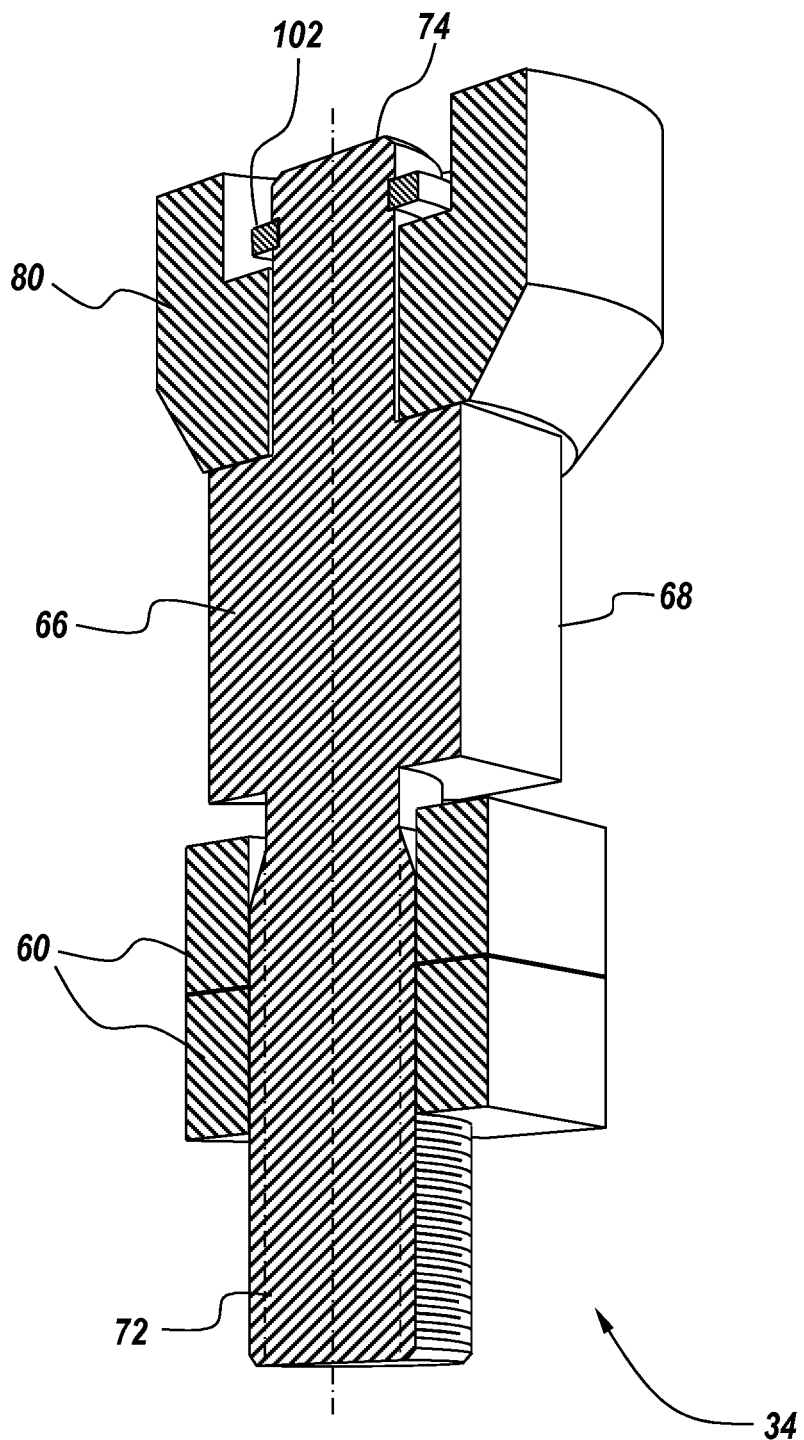
FIG. 5 is an expanded cross-sectional view of the loading element of the loading mechanism according to the teachings of the present invention.
Figure 6:
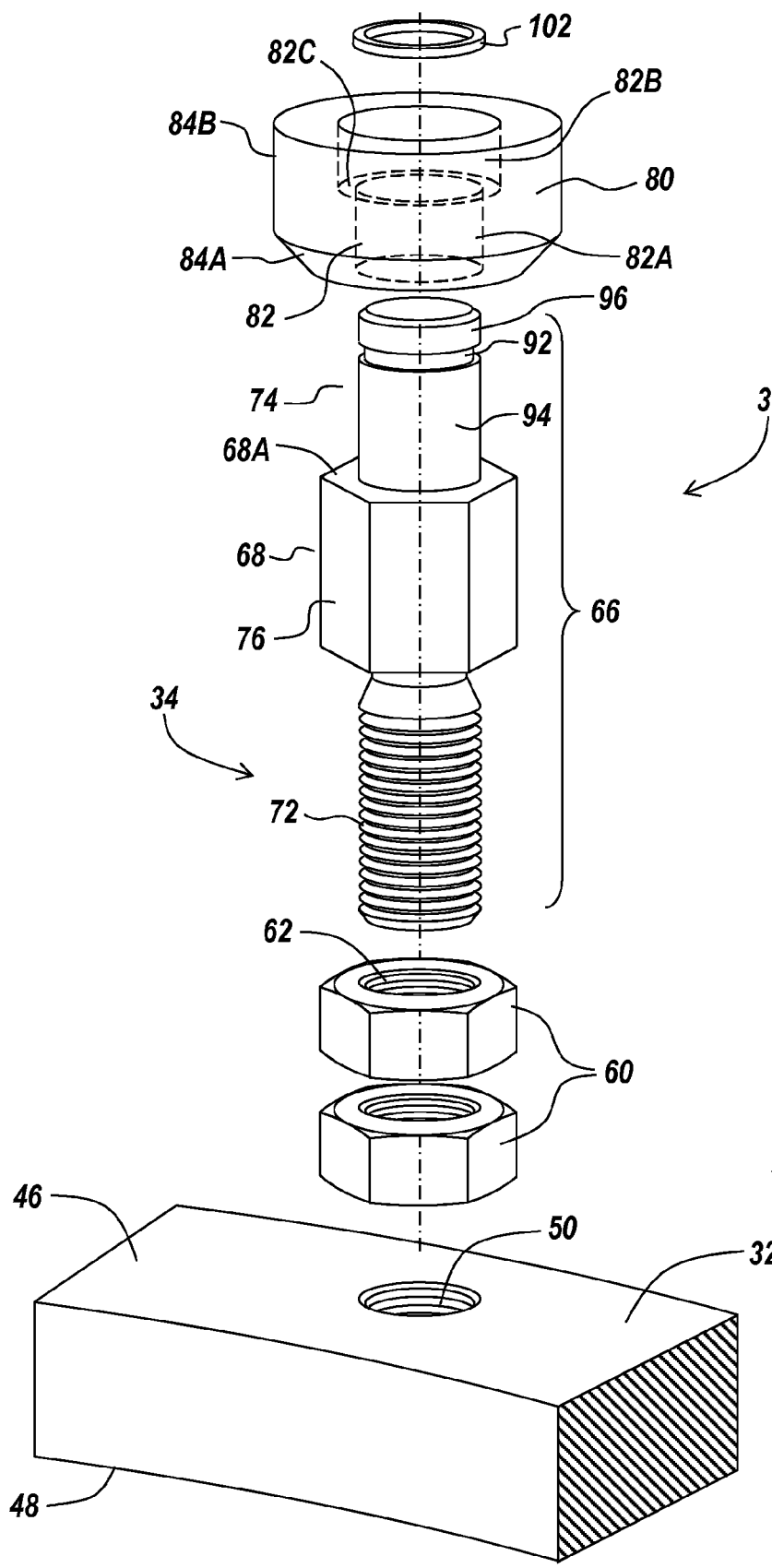
FIG. 6 is an exploded view of the loading mechanism according to the teachings of the present invention.

FIGS. 5 and 6 illustrate in further detail the loading elements 34 of the loading mechanism 30 according to the teachings of the present invention. As shown, each loading element 34 can include a fastening assembly that includes a nut assembly 30 having one or more nut elements. Each nut element can have an inner channel or bore 62 that is preferably threaded and is sized and dimensioned to seat an adjusting element 66. The adjusting element 66 preferably includes a central or intermediate portion that is disposed between a first end portion 72 that is adapted to engage one or more of the nut elements 60 and the rail element 32, and an opposed second end portion 74. The intermediate portion 68 preferably has a thickness or diameter that is larger than the thickness or diameters of the first and second ends 72, 74. The intermediate portion has a circumferential or outer shape that is suitable for cooperating with an external tool, such as a wrench. To that end, and as illustrated, the outer surface of the intermediate portion can have a hexagonal shape that includes a series of chamfered surfaces 76. Those of ordinary skill in the art will readily recognize that the outer surface of the intermediate portion can have any selected diameter and shape.

The second end portion 74 of the loading element 34 is substantially cylindrical in shape and has an outer surface that has a circumferential recess 92 formed therein. The recess thus forms a pair of land surfaces 94, 96 on either side of the recess 92. The recess is sized and dimensioned for seating a locking or retaining element. Those of ordinary skill in the art will readily recognize that the end portion 74 of the loading element can have any selected size and shape.

The loading element 34 of the present invention further includes a foot portion 80 that is sized and configured for coupling to end portion 74 of the loading element 34. Specifically, the foot portion has a central bore 82 that is sized and dimensioned for mounting over the outer surface of the second end portion 74. The bore 82 has a first bore portion 82A having a first diameter and a second bore portion 82B having a second larger diameter portion. The second bore portion has a floor or stepped surface 82C that forms a transition between the two bore portions while concomitantly forming a seat for the retaining element. The foot portion 80 has an outer surface that can have any selected shape and configuration, and preferably has a skirt shape having a narrower or sloped surface 84A and a second substantially cylindrical shaped portion 84B. The sloped surface has a top surface that is adapted in use to contact a top surface or shoulder 68A of the intermediate portion 68 of the adjusting element 66.

The loading element 34 still further includes a retaining element 102 having an outer diameter that is smaller than the diameter of the second bore portion 82B but larger than the diameter of the first bore portion 82A. The clip is sized and dimensioned for seating within the recess 92 that is formed in the end portion 74 of the retaining element. When seated within the recess, the retaining element extends radially outwardly from the recess so as to engage the floor 82C of the bore 82 during use. Those of ordinary skill in the art will readily recognize that any suitable retaining element can be used, such as a retaining clip. Moreover, those of ordinary skill in the art will readily recognize that the bore can have any suitable size and shape.

Those of ordinary skill in the art will readily recognize that the loading element 34 can have any selected shape or size and can be formed of any pre-determined assembly of components, provided that the components of the loading mechanism are sufficient to translate a rotational force into an axial biasing or compressive force.

The selected components of the loading mechanism can be assembled together as follows. The nut assembly 60 of the loading element 34 can be threadingly secured to the threaded end portion 72 of the adjustment element 66. The end portion 72 is then disposed within the aperture 50 of the rail portion 32. The aperture 50 is preferably threaded so as to be able to receive and retain the adjusting element. The foot portion 80 of the loading element 34 is disposed over the end portion 74 of the adjustment element so as to expose the recess 92. The retaining element 102 is mounted or seated within the recess. The top surface of the sloped surface 84A of the foot portion engages with a shoulder portion 68A of the intermediate portion thereby limiting the axial travel of the foot portion 80. When assembled as such, the foot portion is thus retained between the retaining element 102 and the shoulder portion 68A. This connection process is performed for each loading element 34 that is coupled to the rail element 30.

During operation, a plurality of sealing elements 12 and the loading mechanism 30 are placed or fitted within the channel 14 formed in the housing. Those of ordinary skill in the art will readily recognize that the channel can also be formed within a gland element. The loading mechanism or assembly 30 can be inserted as an assembled unit. If the rail element 32 of the loading mechanism is formed in segments, then the rail segments are inserted with the corresponding attached components (e.g., nut assembly 60, adjusting element 68, foot portion 80, and retaining element 102) can be coupled together at their end portions and disposed in the channel. The end portions of the rail segments are preferably configured to mate together, as described above. The loading mechanism 30 is disposed or seated within the channel on top of or above the sealing elements which are stacked together within the channel, FIG. 2. When assembled as such, the loading mechanism is disposed between the topmost sealing element of the sealing assembly and a side wall of the channel when viewed in the axial direction and the roof (e.g., side portion) of the channel 14. In this arrangement, the loading mechanism can selectively apply an axial force (e.g., load) to the sealing assembly. For example, when initially mounted together, the loading mechanism does not apply a load to the sealing assembly, as illustrated in FIG. 2A, thus placing the sealing assembly in an unloaded state or position. In the unloaded state, the sealing assembly may not contact the shaft and/or other surfaces sufficiently enough to prevent or minimize the leakage of fluid. Once mounted together within the channel, the loading mechanism is capable of providing a loading or axial biasing force to the sealing assembly, FIG. 2B, thus placing the sealing assembly in a loaded state or position. In the loaded state, the sealing assembly contacts the shaft and/or other surfaces sufficiently enough to prevent or minimize the leakage of fluid. Hence, the loading mechanism allows the stack of sealing elements to be loaded with axial compression internally within the equipment housing. The axial height of the loading mechanism is generally smaller than the axial space available for mounting the loading mechanism, thereby ensuring that the mechanism can be easily seated within the channel.

The installer then adjusts the axial force applied by the loading mechanism through the rail portion 32 by rotating the adjusting element 66. This is accomplished by using a selected external tool, such as a torque wrench, which when coupled to the intermediate portion rotates the adjustment element. The rotation of the adjustment element serves to move, vary or adjust the position of the rail portion 32 in the axial direction. The amount of sealing force applied by the loading mechanism to the sealing assembly to place the sealing assembly in a loaded state can thus be adjusted and calibrated by the torque wrench. Once the desired torque level has been reached, the tool is removed. Each loading element 34 coupled to the rail portion is similarly adjusted.

The foot portion is coupled to the adjusting element via the retaining element 102. During adjustment, the foot portion remains stationary relative to the housing and allows the adjusting element to rotate. As such, the foot portion is prevented from rotating out of the channel 14 during rotation of the adjusting element. The shoulder surface or portion 68A is also adapted to contact a top surface of the foot portion when rotated. The threaded end portion 72 of the adjusting element 66 is configured such that it can expand and retract out of the threaded holes in the rail portion 32 based upon the load applied to the intermediate portion 3268. As noted above, the threaded end portion is configured to engage with the rail portion 32. As such the rail portion 32 includes a number of threaded apertures 50 sized and dimensioned to receive the threaded end of the adjusting element 66.

As noted above, the adjusting element 66 can be rotated by any suitable instrument, such as a torque wrench, so as to increase or decrease (i.e., adjust) the height of the loading mechanism. By adjusting the axial position of the rail element of the loading mechanism, the seals mounted within the channel 14 can be disposed in the loaded position or state. The loading force applied to the seals can be adjusted to any desired level by the operator. Specifically, the load can be applied by utilizing a torque wrench that limits the amount of force or torque applied to the sealing assembly. This alleviates having a technician or operator use their judgment and allows a precise amount of force to be applied to the sealing assembly. Once the adjustment is made the nut assembly 60, which can comprise one or more nuts, is tightened against the rail portion 32 to fix the load mechanism within the channel by preventing the threaded end portion 72 from rotating relative to the rail portion 32.

The loading mechanism, and specifically the components of the loading mechanism, can be formed from any suitable material, such as a metallic material or metal alloy material. Further, the expected torque measurements when the loading mechanism is tightened can vary, but preferably are between about 10 inch-pounds and about 30 inch-pounds. The use of the internally mounted loading mechanism 30 eliminates the need for employing an external gland that needs to be bolted to the housing in order to axially load the sealing elements.

An advantage of the loading mechanism 30 of the present invention is that torque measurements can be taken as the loading mechanism is being tightened in the field. This allows for a high or precise degree of calibration of the seal. In contrast, in conventional systems such as that illustrated in FIG. 1, the seal loading pressure is estimated based on a number of measurement factors, such as the size of the seals, annular groove, and gland. A prime advantage of the present invention is that the seals can be installed into the channel 14 without the need for access as in conventional configurations through a removable gland 1 with the shaft fully or partially removed from the equipment or system. Depending on the situation this can alleviate efforts for total disassembly of equipment for seal replacement.

We claim:

1. A sealing and loading assembly for a mechanical fluid seal for sealing a shaft, the sealing and loading assembly, comprising:
   a housing having an annular channel surrounding a bore for housing the shaft, the channel having a first axial wall, a second axial wall axially opposite the first wall, and a radial bottom wall extending axially between the first and second axial walls, wherein the first axial wall, the second axial wall, and the radial bottom wall are monolithically formed as a single piece;
   a plurality of sealing elements disposed within the channel and disposed in contact with the bottom wall of the channel; and
   a loading assembly disposed completely within the channel between the plurality of sealing elements and the first axial wall of the channel for providing an adjustable axial loading force to the plurality of sealing elements, the loading assembly including:
      an adjusting element having a threaded first end and an opposed second end;
      a rail element having one or more threaded apertures and being coupled to the threaded first end of the adjusting element;
      one or more nut elements coupled to the threaded first end of the adjusting element; and
      a foot portion coupled to the second end of the adjusting element and coupled thereto via a retaining element;
   wherein the foot portion of the loading assembly contacts and is biased against the first axial wall of the channel and the rail element of the loading assembly contacts and is biased against at least one of the plurality of sealing elements such that upon rotation of the adjusting element of the loading assembly with respect to the one or more nut elements the rail element moves axially within the channel so as to apply an axial biasing force to the plurality of sealing elements so as to compress the plurality of sealing elements against the bottom radial wall of the channel.

2. The sealing and loading assembly of claim 1, wherein the adjusting element further comprises an intermediate portion disposed between the threaded first end and the opposed second end, wherein the intermediate portion has a thickness that is larger than the a thickness of the threaded first end and the opposed second end.

3. The sealing and loading assembly of claim 1, wherein the foot portion comprises a central bore having a first unthreaded bore portion having a first diameter and second unthreaded bore portion having a second diameter larger than the first diameter.

4. The sealing and loading assembly of claim 3, wherein the foot portion further comprises an outer surface having a first sloped portion having a top surface and a second substantially cylindrical surface.

5. The sealing and loading assembly of claim 1, wherein the adjusting element has a recess formed on the opposed second end, wherein the recess is sized and configured for seating the retaining element.

6. The sealing and loading assembly of claim 1, wherein the adjusting element is rotatable relative to the foot portion.

7. The sealing and loading assembly of claim 1, wherein the rail element is arcuate in shape and the one or more threaded apertures comprise a plurality of threaded apertures formed therein.

* * * * *